United States Patent [19]

Cole et al.

[11] Patent Number: 5,725,899
[45] Date of Patent: Mar. 10, 1998

[54] PROTEIN-LIPID EMULSIFYING AND GELLING COMPOSITION AND METHOD OF PREPARING SAME

[76] Inventors: Morton S. Cole, 4666 Faries Pkwy., Decatur, Ill. 62525; Lloyd Steven Young, 1550 Waconia Ave. SW., Cedar Rapids, Iowa 52406

[21] Appl. No.: 246,081

[22] Filed: Mar. 20, 1981

Related U.S. Application Data

[63] Continuation of Ser. No. 90,008, Oct. 31, 1979, abandoned, which is a continuation-in-part of Ser. No. 887,117, Mar. 16, 1978, abandoned.

[51] Int. Cl.⁶ .......................................... A23F 2/38
[52] U.S. Cl. .................................. 426/598; 426/656
[58] Field of Search ............................ 426/662, 656, 426/653, 589, 96, 99, 598, 640

[56] References Cited

U.S. PATENT DOCUMENTS

| | | | |
|---|---|---|---|
| 1,843,051 | 1/1932 | Thiele | 426/662 |
| 2,632,705 | 3/1953 | Scharf | 426/662 |
| 2,740,720 | 4/1956 | Horvath | 426/662 |
| 3,060,030 | 10/1962 | Obernauf et al. | 426/662 |
| 3,268,335 | 8/1966 | Circle et al. | 426/662 |
| 3,549,382 | 12/1970 | Hansen | 426/662 |
| 3,661,795 | 5/1972 | Pardum | 426/662 |
| 4,234,620 | 11/1980 | Howard et al. | 426/656 |

*Primary Examiner*—Cynthia L. Nessler

[57] ABSTRACT

A dry, bland-tasting composition of vegetable protein and lipids that is readily dispersible in water and aids in forming stable emulsions and self-supporting gels when dispersed in water and heated, and a process for preparing the composition. A preferred composition embodies 5–30 parts by weight of vegetable protein (soy protein) and 7–12 parts by weight of vegetable oil, commercial lecithin, or a mixture of both, the composition being readily dispersible in water.

6 Claims, No Drawings

PROTEIN-LIPID EMULSIFYING AND GELLING COMPOSITION AND METHOD OF PREPARING SAME

This is a continuation of application Ser. No. 090008, filed Oct. 31, 1979, now abandoned which, in turn, was a continuation-in-part of application Ser. No. 887,117, filed Mar. 16, 1978 now abandoned.

This invention relates to a novel composition of lipoprotein material having emulsification and gel-forming properties and more particularly to such a composition prepared from edible soy flour.

Eggs, milk, proteins, and other natural products are very useful not only as a food per se but also as emulsifiers and gelling agents in the preparation of other food compositions. These natural materials are good sources of fat and protein but they are somewhat expensive sources of these nutritional factors. There are many other sources of protein and fat that are much less expensive, but they are not combined to provide the functional utility of the natural products. For example, vegetable protein, especially soy protein, is a much less expensive source of protein than animal protein and it has been the objective of much research to employ vegetable protein in place of animal protein, particularly in food products. An example of such research is the meat analog made from defatted soy protein material as described and claimed in U.S. Pat. No. 3,488,770 to Atkinson or a milk substitute from soybeans as described and claimed in U.S. Pat. No. 3,901,978 to Nelson et al.

Protein has many useful properties in its natural state but these properties are sensitive to environment changes such as heat, light, pH, etc. The water solubility of protein, for example, changes to insolubility when protein is heated or its pH is changed considerably. These properties are frequently referred to as "functional" properties because they relate to the uses to which the protein can be put. It is, of course, highly desirable to maintain as many functional properties as possible so that the protein can be put to as many uses as possible. Unfortunately, the recovery of protein from its naturally occurring sources frequently requires treatments which materially limit the functional properties. It is for this reason that vegetable protein frequently cannot be used as a replacement for animal protein. Additionally, soy beans contain certain enzymes which cause the production of undesirable flavors. These enzymes can be deactivated by heat, pH changes, etc., but such treatments may reduce the functionality of the protein. For such reasons it has been difficult to employ vegetable protein for human food in many instances.

The present invention provides a composition of lipoprotein material derived from soybeans which is in the form of a stable, dry powder and which has the functional properties of being dispersible, an emulsifier, and having gel-forming properties. To this extent the composition is intended to be a substitute for the lipoprotein composition of eggs, for example.

Dehulled native soybean hypocotyls contain approximately 43.4% protein, 24.3% fat, 5.0% ash, and 27.4% nitrogen-free extract plus fiber (Smith and Circle, *Soybeans: Chemistry and Technology*, Vol. 1, Avi Publishing, Westport, Conn., 1972). The fat content of the native soybean is held in small sack-like structures. Fat is not released until the soybean is crushed and solvent extracted. Thus, the native soybean has substantially less of protein-lipid interaction products or lipoproteins than the products of this invention.

Protein products derived from soybeans are accepted as nutritious foods and as a source of functional properties of value in food systems such as water holding, emulsification, gellation, film forming, and the like.

The proteins derived from soy are generally categorized in three distinct groups according to their protein concentration. Defatted soy flours contain approximately 50% protein and are prepared from dehulled soybean meats that have been solvent-extracted, heat treated, and ground to a flour. Soy protein concentrate contains 70% protein on a moisture free basis. In addition to removal of fat, soluble carbohydrates have been removed by aqueous or mixed aqueous/organic solvent extraction. Isolated soy proteins contain 90% or more protein, generally extracted from defatted soy flour by alkaline solutions. The extracted protein is recovered by isoelectric precipitation or by neutralization and drying. The commercial value of these soy products increases as protein concentration increases, due mainly to the improved functional characteristics of the higher protein products.

Accordingly, it is an object of this invention to provide more functional products from soy flours than have heretofore been available. This objective is achieved by forming an aqueous dispersion of soy flour and lipid materials in the approximate ratios as they occur naturally in the soybean. The emulsion is then dried to obtain a powder with the approximate composition of the whole bean. Upon redispersion in water, the dried protein product forms a milk-like emulsion which provides emulsification and gel-forming properties that are useful in the preparation of foods.

A further object of this invention is the employment of a dry stable protein-lipid product to form a variety of food emulsions that are high in the nutrients that the soybean provides. Among these products are soy milk, a substitute for cow's milk, yogurt, frozen yogurt, salad dressings, sour cream dressings, cake ingredients, etc. In each of these applications the emulsifying and gel-forming functional properties of the protein is essential to the application.

PRIOR ART STATEMENT

A protein-lipid composition having utility as food emulsifier is described by Circle et al (U.S. Pat. No. 3,268,335). Their product is described as a fiber-free mixture of soy protein and soy lecithin containing between 20 and 60% protein. The process of preparing this composition is involved and requires the formation of an isolated protein curd as a precursor to formation of the dried complex of isolated soy protein and lecithin. In contract, the present invention is based upon fiber-bearing soy flours which do not require expensive processing or formation of a curd prior to combination with lecithin.

U.S. Pat. No. 3,549,382 to Hansen shows the preparation of an antistaling composition for use in bread. The composition contains hydroxylated lecithin, a monoglyceride of a fatty acid, and a dry product which may be starch, flour, or dry skim milk. This mixture is made into a creamy dispersion and dried to a powder which is added in its dry state to the dry ingredients used in making bread. There is no mention of mixing soy flour or soy protein in any form with oil or lecithin to produce an emulsifying and gellable composition.

U.S. Pat. No. 2,740,720 to Horvath discloses a nutritious composition for use in confectionary products. The composition is a mixture of alcohol-extracted protein and soy lecithin. The dry ingredients are mixed in a grinder and the product mixture added to the confectionary composition. The mixture of protein and lecithin has very low water solubility and practically no gellation or foaming characteristics. Thus, while it has the ingredients of protein and lecithin, it has practically none of the functional properties to which the applicants' invention is directed.

U.S. Pat. No. 1,843,051 to Thiele discloses additives for baking compositions. The additive here is soy lecithin, and it is said to cause an "increase of the baker's products" by "as much as 40%." There is no mention of mixing soy flour, lecithin, and soybean oil and drying the resulting mixture as is done in the present invention.

U.S. Pat. No. 2,632,705 to Scharf is prepared from gelatinized corn flour rather than a soy protein material. It is well known that gelatinized starches form self supporting gels and the ability of the Scharf material to form such a gel is not surprising. None of the soy protein materials listed above except that prepared according to the teachings of this application formed a self supporting gel.

A more recent patent (U.S. Pat. No. 3,901,978) discloses the preparation of a milk-like beverage by cooking whole soybeans to inactivate the enzyme lipoxygenase, forming a slurry of the cooked soybeans and water and homogenizing this slurry to obtain a milk-like dispersion of soybean protein and fat in water. This approach is similar to typical oriental processes for producing soy milks except that the whole beans are first heated to inactivate the enzyme lipoxygenase. This enzyme, if allowed to act upon the unsaturated fatty acids contained in soybean oil, produces a variety of flavors that are considered unacceptable to Western tasts. The preparation of this product involves a wet process which yields as inedible by-products the hulls and other debris that are removed from a dilute homogenized slurry of cooked beans by filtration or centrifugation. The final fluid product is too dilute to dry economically without expensive vacuum concentration and so must be stabilized by refrigeration or thermal processing.

The present invention produces a soy beverage that is acceptable to Western tasts and in which the enzyme lipoxygenase and the antinutritional factor Trypsin Inhibitor have been eliminated by choosing a heat treated, defatted soy flour which no longer contain these undesirable factors and which can be further processed like milk by the addition of appropriate lactic acid organisms to prepare products such as yogurt, sour cream, dressings, dips and other products analogous to similar emulsions made from cow's milk. Other forms of the product of this invention are used in dry form as an ingredient in baked goods, e.g., cakes.

The milk-like product of the present invention is prepared by a process which yields only the single main beverage product. There are no by-products. The dried milk-like product of this invention is stable on dry storage and therefore may be transported economically. It is easily reconstituted when desired to yield a nutritious milk-like beverage.

The present invention provides a dry, bland-tasting edible composition comprising 5–30 parts by weight of vegetable protein and 7–12 parts by weight of vegetable oil, commercial lecithin, or a mixture of both, the compositions being readily dispersible in water. In *The Condensed Chemical Dictionary*, Ninth Edition, 1977, "vegetable oil" is described as an oil extracted from the seeds, fruit or nuts of plants and considered to be mixtures of mixed glycerides (e.g., cottonseed, linseed, corn, coconut, olive, tung, peanut, etc.)

The process for preparing this composition involves the formation of a homogeneous aqueous dispersion of defatted protein-aqueous oil-seed flour and lipid materials and drying the dispersion to produce a dry powder having the film-forming property.

In particular embodiments of this invention, the composition may comprise soy flour having approximately 50% protein content and commercial lecithin, preferable proportions of these two materials being 17/10 parts by weight. Still another preferred product of this invention comprises soy flour containing approximately 50% protein and soybean oil, the proportions of these two materials being 10/5.6 parts by weight in a preferred embodiment.

One of the components of the composition and process of this invention is commercial lecithin which contains a mixture of phosphatides, oil, and a minor proportion of extraneous ingredients. Although lecithin is available from sources such as eggs, it is very expensive to employ such sources and for this reason lecithin is commonly employed as a product from soybeans. The "commercial lecithin" is one in which the phosphatides (among which is lecithin) comprise about 50–60% by weight, soybean oil comprises approximately 35% by weight, and the remainder is a mixture of extraneous products derived from soybeans. In this invention the term "commercial lecithin" is employed to mean a product having the above composition and being derived from soybeans.

The lipids of this invention comprise oil and/or commercial lecithin. In some embodiments of this invention the entire amount of lipids can be oil and in other embodiments of this invention the entire amount of lipids can be commercial lecithin. Still other embodiments of this invention employ a mixture of both oil and commercial lecithin. In the preparation of the composition employed in baked goods, e.g., cakes, it is preferred to employ a composition prepared from soy protein materials (either flour containing 50% protein or concentrate containing 70% protein) and commercial lecithin as the sole lipid component. In other embodiments of this invention wherein the product is employed in making a milk-like product or an emulsion-product (dressings, yogurts, etc.) the soy protein may be the flour containing 50% protein or the concentrate containing 70% protein and soybean oil as the sole lipid component. In this invention the term "commercial soybean oil" is intended to mean that which is purchased on the open market from any of many suppliers.

The proportions of ingredients in the final dry composition of this invention are preferably approximate those found in the natural untreated oil seed. For example, when soybean is the oil seed, the weight proportions of protein and lipids are preferably about 2:1, respectively. It is not critical, however, that such proportions be maintained. The protein content of that proportion can vary widely; i.e., from about 5 to about 30 parts by weight, while the lipids very from about 7 to about 12 parts by weight, the lipids being commercial lecithin, vegetable oil, or a mixture of both.

It is not necessary to add any dispersing agent to the process of this invention, although it may be advantageous in some embodiments to do so. It will be seen that in some of the working examples a small portion of mono- and di-glycerides are employed. If this is preferred, the amount should approximate that of the lecithin content.

The aqueous dispersion employed in the process of this invention may vary widely in its composition. Generally, the solids (flour) content may be from about 5 to 70%, the exact amount being whatever is convenient for handling. When spray drying is employed, it is preferred that the fluidity of the dispersion be sufficient to facilitate spraying and that is from about 8% to about 50% flour solids.

Although soybean components are preferred because of the high nutritional quality of soy protein as compared to other vegetable protein sources, it is to be understood that this invention is not limited to the use of soy protein, soybean oil, or soybean lecithin. Other oil-seed proteinaceous materials such as peanuts, safflower seeds, sunflower seeds, sesame seeds, cotton seeds, etc., are suitable. Oils from such seeds are likewise suitable in this process. Lecithin is employed as an emulsifier for the oil, and, while additional emulsifiers may be added, commercial lecithin is preferred solely for this function.

In the process of this invention, the aqueous dispersion of protein and lipids must be dried to a stable, dry powder. The most advantageous drying method is spray drying because it produces fine particles in the process of drying. Other drying methods may be employed, such as evaporation, drum drying, freeze drying, and the like so long as the procedure does not destroy or significantly damage the functional properties of the protein, principally the film-forming property. When the ultimate utility is to employ the composition as an ingredient in a cake, drum drying is adequate.

A particularly important part of this invention is the dry, stable composition formed by the process described above. This composition contains 5–30 parts by weight vegetable protein in the form of a flour containing fiber and, perhaps, water-soluble carbohydrates as found in the natural vegetable and 7–12 parts by weight lipids. One preferred composition contains 10 parts soy protein as a flour containing 5% protein and the remainder fiber, carbohydrates, etc., and 5.6 parts by weight soybean oil. The dry composition is edible and it exhibits a bland taste: i.e., not beany or "green" as natural soybeans are sometimes described. Another preferred composition contains 17 parts by weight soy protein as a flour containing 50% protein and the remainder fiber, carbohydrates, etc., and 10 parts by weight commercial lecithin. This product is a bland-tasting edible component of bakery products.

In the following examples there are illustrative embodiments of this invention. It is not intended that this invention should be limited to those embodiments since they are not meant to present the full scope of the invention but rather only the preferred procedures and compositions. Parts and percentages are by weight unless otherwise mentioned and temperatures are in degrees Fahrenheit unless otherwise specified. The soybean oil and lecithin used are the commercial products as described above, whether hydroxylated or not.

In the present invention and in the examples, certain preferred relationships of the various reactants are set out in weight percent. For purposes of shipping and economy as well as safety, the water content in the aqueous compositions below may be omitted, leaving so-called neat compositions which are in the range of about 2 parts by weight of soy flour to 1.5 parts by weight of a mixture of soy oil and lecithin.

|  | Weight | Weight % |
|---|---|---|
| Soy Flour | 640 g | 24.80 |
| Lecithin | 40 g | 1.55 |
| Mono and Diglycerides | 40 g | 1.55 |
| Soy Oil | 360 g | 13.95 |
| Water | 1500 ml | 58.15 |
| Soy Flour | 8000 g | 15.65 |
| Water | 36000 ml | 70.43 |
| 20% Sodium Hydroxide | 1370 ml | 2.68 |
| 20% Phosphoric Acid | 1500 ml | 2.93 |
| Antrax | 6.2 ml | .01 |
| Soy Oil | 4240 ml | 8.29 |
| Soy Flour (dispersed in 100–67 ml water to give 25–33% total solids) | 32 g |  |

-continued

|  | Weight | Weight % |
|---|---|---|
| Soybean Oil | 18 g |  |
| Lecithin | 2 g |  |
| Water | 100–67 ml | 75–66 |
| Soy Oil | 640 g | 27.63 |
| Lecithin | 16 g | .69 |
| Mono and Diglycerides | 16 g | .69 |
| Soy Oil | 144 g | 6.22 |
| Water | 1500 ml | 64.77 |

EXAMPLE 1

A protein-lipid composition was prepared from a refined soy flour containing approximately 50% protein according to the formula and procedure shown below. The soy flour employed had a protein dispersibility index (PDI) of approximately 70.

|  | Weight | Weight % |
|---|---|---|
| Soy Flour | 640 g | 24.80 |
| Hydroxylated Commercial Lecithin | 40 g | 1.55 |
| Mono and Diglycerides* | 40 g | 1.55 |
| Commercial Soybean Oil | 360 g | 13.95 |
| Water | 1500 ml | 58.15 |

*Atmos 150 ICI America

The above composition was blended for 10 minutes until uniform. The dispersion was then homogenized by means of a Manton-Gaulin two-stage laboratory homogenizer at pressures of 5000 psi at stage 1 and 2000 psi at stage 2. The dispersion was recycled through the homogenizer for a period of 10 minutes. The blend was then spray dried by means of a Bowen vertical laboratory spray drier at a drier inlet temperature of 500° F. and outlet temperature of 175° F.

A dried product was obtained which, on reconstitution in water, was at a concentration of approximately 8% and formed a bland-tasting, milk-like protein beverage.

EXAMPLE 2

Circle et al (U.S. Pat. No. 3,268,335) describe a protein product and process that involve the isolation of a soy protein followed by the addition of a lecithin dispersion, the mixture then being spray dried. Emulsification properties were described for the resulting protein-lecithin product based on its incorporation in a bakery product and in ice cream.

A product of this invention was prepared, as well as the product of Example VII of Circle et al U.S. Pat. No. 3,268,335. The two samples were compared for emulsification capacity and gel-forming ability.

Emulsification capacity was determined as ml of oil emulsified per 100 mg protein. The end point was at the inversion of an emulsion from an oil-in-water to a water-in-oil emulsion on the basis of the electrical resistance of the emulsions. Resistance is measured by a Volt OHM Meter (VOM). Electrical resistance increases to infinity when the emulsion inverts to a water-in-oil system. 300 g of a 0.2% protein dispersion was blended at high speed for 20 seconds. The dispersion was adjusted to pH 7 and 50 g of the protein dispersion was added to the jar of a high speed blender that was equipped with electrodes connected to the VOM. The blender was run for 10 seconds and oil was added at a uniform high rate from a burette directly into the protein dispersion while blending was continued. When the VOM set at R×10,000 indicated infinite resistance, oil flow was stopped. The ml of oil emulsified per 100 mg protein was calculated.

Gel-forming properties were determined by blending 45 g of protein-containing sample, 0.75 g salt and 104.25 g water for one minute. 45 g aliquots of each mixture were placed in 50 ml beakers which were covered with aluminum foil and heated in a 165 F. water bath for 30 minutes. The beaker and contents were refrigerated over-night, tempered at room temperature for 2 hours and the contents were carefully removed by inserting a thin knife blade between the beaker wall and the contents. Gel-forming ability was indicated by the ability of the beaker contents to support its own weight after removal from the beaker.

The Circle et al sample was prepared by dispersing 800 g of isolated soy proteinate (Promine D, Central Soya Company) in 4500 g of tap water. 800 g of dried lecithin granules (Central Soya Company) was dispersed separately in 1900 g of water. The lecithin and water were passed through a colloid mill to obtain a uniform dispersion. The separate protein and lecithin dispersions were combined and stirred for 30 minutes. Thereafter, the product was spray dried at 250° F. inlet and 250° F. outlet temperatures.

A sample of protein-lipid composition was prepared according to the teachings of the present application. 8000 g. of a defatted soy flour having a Protein Dispersibility Index (PDI, method 46-24, Approved Methods of the American Association of Cereal Chemists) of 35–40 was dispersed in 36 liters of water. 1370 ml of 20% sodium hydroxide was added to the dispersed soy flour to obtain a pH of approximately 12. The alkaline mixture was mixed at ambient temperature for 30 minutes before neutralizing to pH 7 by adding 1500 ml of 20% phosphoric acid. 4240 g of refined soybean oil (ADM 436) and 6.2 g of antioxidant (Tenox 20, Eastman Chemical Company) were added to the neutral protein dispersion. The mixture was heated to a temperature of 180° F. by means of a continuous heat exchanger (Votator, Chemetron Company) followed by flash cooling at 26 inches of vacuum (Versator, Cornell Machine Company). The protein-lipid dispersion was homogenized at 3500 psi and spray dried at 280° F. inlet and 180° F. outlet temperatures.

The emulsification capacity of the two samples was determined by the procedure described above with the following results.

|  | ml oil/100 mg protein ave. of 3 determinations | Std. Dev. |
| --- | --- | --- |
| Circle et al 3,268,335 | 46.1 ml | 0.586 |
| Present application | 72.2 | 0.751 |

The difference between the two products is statistically significant and emulsification capacity is clearly a means for differentiating the product of Circle et al from the present invention.

The two samples described above were also subjected to the gel-forming test also described above. The product of this application formed a moderately firm self-supporting gel, while the product of Circle et al was very soft and not self-supporting. This observation further differentiated the present invention from that of Circle et al.

EXAMPLE 3

The general procedure employed to study various protein sources in milk-like products was as follows: (1) 32 g. of defatted soy flour was dispersed in water to obtain 25–33% total solids. (2) 18 g. of hydrogenated soybean oil and 2 g. of hydroxylated lecithin were combined. 8 g. of this mixture was added to the aqueous protein dispersion of (1). The resulting mixture was blended for 5 minutes, heated to 75° C. and homogenized at a pressure of 5000 psi first stage and 2000 psi second stage. The homogenized product was cooled to room temperature and spray dried under conditions similar to those described in Example 1.

10% aqueous dispersions of prepared lipoprotein were prepared by means of a Waring Blender. Samples were chilled to 4° C. and evaluated organoleptically.

A product made with a 70 PDI soy flour containing 50% protein (ADM Bakers Nutrisoy) and partially hydrogenated soybean oil (ADM 436 oil) contained 43.9% protein, 14.7% fat, 5% ash, and 2.4% moisture after spray drying. 10% of this material in water formed an off-white dispersion that was not grainy or chalky in mouthfeel and which had only a trace of soy-like flavor.

EXAMPLE 4

A soy milk preparation was made and spray dried according to the following formula and procedure:

|  | Weight | Weight % |
| --- | --- | --- |
| Defatted Soy Flour (PDI 70 approx. 50% Protein) | 640 g | 27.63 |
| Lecithin | 16 g | 0.69 |
| Mono- and Diglycerides | 16 g | 0.69 |
| Soybean Oil | 144 g | 6.22 |
| Water | 1500 g | 64.77 |

The above ingredients were combined and mixed for 10 minutes. The mixture was homogenized by means of a Manton-Gaulin two-stage laboratory homogenizer at pressures of 5000 psi first stage and 2000 psi second stage for 10 minutes. The homogenized emulsion was spray dried by means of a Bowen spray drier at an air inlet temperature of 500° and air outlet temperature of 175° F.

A cream-color white powder was obtained. 40 g. of the spray dried powder was added to 500 ml of warm water (50°–60° C.) and blended with a high speed mixer (Imperial Plusmatic 10, Osher Mfg. Co.) operating at approximately 10,000 RPM. After mixing for 1 minute, the homogenized blend was vacuum deaerated by means of a water aspirator to eliminate the effect of entrapped air on film formation.

EXAMPLE 5

This Example shows that the mono- and diglyceride component is not essential for preparing a stable emulsion.

A dispersed emulsion was prepared according to the general procedure given in Example 1 for the following components:

|  | Weight | Weight % |
| --- | --- | --- |
| Defatted Soy Flour (PDI 70; approx. 50% protein) | 32 g | 5.92 |
| Soybean Oil | 7.2 g | 1.33 |
| Refined Lecithin | 0.8 g | 0.15 |
| Water | 500 g | 92.60 |

The composition of this invention in the dry form can be used to prepare many food products normally prepared from cow's milk. The dry composition of this invention is dispersed in water to produce soy milk which, in turn, is employed to make products such as yogurt, salad dressing, sour cream, snack dips, etc. The following examples illustrate such uses.

EXAMPLE 6

Soy Yogurt

A yogurt-like product was prepared according to the following procedure. A 12% dispersion of a spray dried soy milk preparation plus 0.025% Carageenan was autoclaved to destroy contaminating microorganisms and then cooled to 45° C. The milk-like dispersion was inoculated with 0.8 g/l of a frozen lactic culture (Microlife culture #403, Microlife Technics, Sarasota, Fla.). The inoculated milk was then incubated at 45° C. for 7-8 hours. A thickened yogurt-like material resulted having an acid flavor and a slightly thickened consistency.

EXAMPLE 7

Soy-milk Yogurt

Yogurt is usually considered to be a lactic fermented dairy product. Although lactic organisms will grow in a soy base, a combination of soy and milk protein bases yields a product that is more typical of yogurt. Such a product is prepared as follows:

A dispersion is made containing 10% of the dry product of Example 1, 5% non-fat milk solids and 0.25% Carageenan. This dispersion was heated to 86°-90° C. for 30 minutes and then cooled to 45° C. The dispersion was inoculated with 0.8 g/l of a frozen lactic culture (Microlife culture #403). The inoculated culture was then incubated at 45° C. for 7-8 hours. After this time a smooth, thickened curd having acid development and appearance typical of yogurt obtained from co's milk was obtained.

EXAMPLE 8

Sour Dressing

A soy-based sour dressing analogous to dairy sour cream was prepared as follows:

| | |
|---|---|
| Soy Yogurt | 2800 g |
| Hydrogenated Soybean Oil | 346 g |

The hydrogenated soy oil was melted and added to the soy yogurt with agitation. The soy yogurt had previously been placed in a 55° C. water bath. After the combined melted fat and yogurt had been brought to a temperature of about 55° C., the combined and warmed ingredients were then homogenized at 3000 psi and chilled.

The resulting product was a creamy white thickened mixture having a tangy flavor similar to natural dairy sour cream.

EXAMPLE 9

Frozen Soy Yogurt Dessert

A frozen yogurt dessert was prepared from a soy yogurt similar to that described in Example 6 according to the following formula and procedure:

| | |
|---|---|
| Soy Yogurt | 3000 g |
| Hydrogenated Soy Oil | 480 |
| Sugar | 300 |
| 42 DE Corn Syrup Solids | 300 |
| Algin Stabilizer (Dariloid XL) | |
| Mono- and Diglycerides (Myvatex 8-06K) | |
| Polysorbate 80 | |

Hydrogenated oil and emulsifiers were melted together and added to the yogurt in a 60° C. water bath with stirring. Sugar, corn syrup solids and algin stabilizer were dry blended and added to the yogurt mixture with agitation. The blend of ingredients at a temperature of about 60° C. was homogenized at 3000 psi and then chilled to a temperature of about 4° C. This mixture was allowed to age for about 4 hours. 2000 g of the above mixture was combined with 500 g of pureed frozen strawberries and 35 ml of a dilute solution of an artificial red color (F.D. & C. Red #3). This mixture was added to a mechanical ice cream freezer and drawn at a temperature of 27° F. The resulting product was similar in flavor and appearance to a strawberry yogurt frozen dessert.

EXAMPLE 10

A film-forming composition was prepared from a refined soy flour containing approximately 50% protein according to the formula and procedure shown below.

| | Weight | Weight % |
|---|---|---|
| Soy Flour | 1280 g | 12.21 |
| Water | 8000 ml | 76.34 |
| Sodium Hydroxide (5N solution) | 200 g | 1.91 |
| Phosphoric Acid (5N solution) | 250 g | 2.38 |
| Hydroxylated Lecithin | 750 g | 7.16 |

The soy flour employed had a PDI of 70. Soy flour and water were blended together. Sodium hydroxide was added and the mixture held for 30 minutes. The mixture was neutralized to pH 7 with 250 g 5N phosphoric acid. Hydroxylated lecithin was added and the temperature of the mixture was raised to 80° C. by means of direct steam injection, followed by flash cooling in a vacuum chamber. The dispersion was homogenized and spray dried. The resulting dried product was a bland-tasting powder. This product in dry form was particularly suitable in the preparation of baked goods.

EXAMPLE 11

Cakes were prepared from the dry product of Example 10 and from a corresponding soy flour product which had not been treated with commercial lecithin in accordance with the procedure of Example 10. The following recipes were employed for the two products referred to as "control" for the product prepared with untreated soy flour and "lecithinated flour" for the soy flour treated with the process of this invention.

| Ingredient | Control | Lecithinated Flour |
|---|---|---|
| Cake flour | 567.5 g | 567.5 g |
| Salt | 17.75 | 17.75 |

-continued

| Ingredient | Control | Lecithinated Flour |
| --- | --- | --- |
| Baking powder | 35.5 | 35.5 |
| Shortening ("Hi Cake") | 255.25 | 230.75 |
| Granulated sugar | 681.0 | 681.0 |
| Nonfat dry milk | 56.76 | 28.37 |
| Lecithinated soy flour | — | 28.37 |
| Water | 283.75 | 311.75 |
| Vanilla extract | 7.0 | 7.0 |
| Whole egg | 283.75 | 283.75 |
| Water | 227.0 | 227.0 |

The first four ingredients in the above listing were mixed in a blender at low speed following which the next five ingredients were added and the mixing continued for 5 minutes at low speed. The last two ingredients were then added and the mixing continued for an additional 5 minutes at low speed. The resulting batter in the amount of 453 g was placed in an 8-inch pan and baked at 360° F. for 27 minutes. The resulting cakes were compared and it was readily observable that the cake made from the lecithinated soy flour had much greater volume, was more tender, and had an improved flavor. Furthermore, this product exhibited a greater shelf life than the control product.

EXAMPLE 12

This example shows the preparation of a salad dressing made from the composition of Example 10. The following ingredients were mixed as shown below.

| Ingredient | Amount |
| --- | --- |
| Commercial soybean oil | 60 g |
| Dry product of Example 10 | 10 g |
| Sugar | 20 g |
| 5% Vinegar | 45 g |
| Water | 76 g |
| Salt | 0.5 tsp. |
| Chile sauce | 1 tbsp. |
| Chopped green papper | 2 tbsp. |
| Chopped onion | 1 tbsp. |
| Paprika | 0.5 tsp. |
| White pepper | 0.125 tsp. |
| "Xanthan"* Gum | 0.25 tsp. |
| "Dariloid"* Sodium Alginate | 0.375 tsp. |

*Product of Kelco Company

The dry product of Example 10 was mixed in warm water and blended for 5 minutes following which the soybean oil was added while stirring. The remaining ingredients were then added all at the same time and the blending continued for 5 minutes to produce an excellent tasting salad dressing having a creamy texture.

Although the invention has been described in considerable detail with reference to certain preferred embodiments thereof, it will be understood that variations and modifications can be effected within the spirit and scope of the invention as described hereinabove and as defined in the appended claims.

We claim:

1. A process for the prepration of a dry protein-lipid composition comprising:

(a) mixing ingredients consisting essentially of water and 5–30 parts by weight of defatted oil-seed protein material and 7–12 parts by weight of lipids taken from a group consisting of soybean oil, commercial lecithin, or a mixture of both, in proportions which lead to a final product of up to (1) aproximately 17 parts by weight of defatted oil-seed protein material, and (2) 10 parts by weight of said lipids, (b) homogenizing said ingredients mixed in step (a) into a homogenized aqueous dispersion of defatted oil-seed protein material and lipid materials, and (c) drying the dispersion to produce a dry powder which consists essentially of up to (1) approximately 17 parts by weight of defatted oil-seed protein material and (2) 10 parts by weight of said lipids.

2. A product made by the process of claim 1 consisting essentially of (1) approximately 10 parts by weight of said defatted oil-seed protein material and (2) 5.6 parts by weight of said lipids.

3. A product made by the process of claim 1 wherein said homogenized aqueous dispersion of defatted oil-seed protein material and lipid materials contains water in amounts which range in content from about 50% to about 93% of said dispersion.

4. The product of claim 3 wherein the lipid material is essentially soy oil.

5. The product of claim 3 wherein the lipid material is essentially lecithin.

6. A product made by the process of claim 1.

* * * * *